Patented Feb. 22, 1944

2,342,448

UNITED STATES PATENT OFFICE 2,342,448

PEST CONTROL

Euclid W. Bousquet, Wilmington, Del., assignor to E. I. du Pont de Nemours & Company, Wilmington, Del., a corporation of Delaware No Drawing. Application February 18, 1942, Serial No. 431,368

2 Claims. (Cl. 260—454)

This invention relates to pest control and particularly to novel chemical compounds having the paralytic and lethal properties requisite of fly spray toxicants.

I have synthesized a new organic dithiocyanate, di-isobutylene dithiocyanate, by reacting di-isobutylene, potassium thiocyanate and bromine. The active thiocyanating agent apparently is the thiocyanogen formed by the oxidizing action of bromine on the potassium thiocyanate, the thiocyanogen reacting to add two thiocyanate groups at the double bond. The reaction suitably is carried out in a solvent such as glacial acetic acid, ether, or ethylene dichloride with bromine or chlorine and an inorganic thiocyanate. It will be understood, however, that other methods of producing and reacting thiocyanogen with di-isobutylene are within the scope of the invention.

A suitable method for the preparation of di-isobutylene dithiocyanate is illustrated in the following example:

Example

A solution of 12 cc. of bromine in 100 cc. of glacial acetic acid was slowly dropped into a stirred mixture of 22.4 g. of di-isobutylene (mixed isomers B. P. 101–102.5° C.), 250 cc. of glacial acetic acid, and 63 g. of potassium thiocyanate while maintaining the temperature at 0–5° C. by suitable refrigeration. The reaction was allowed to proceed one hour at this temperature after mixture of the above reagents. The cold reaction mixture after filtration from solid reaction products was reduced by evaporation to a volume of 200 cc. and then diluted with 500 cc. of water. This water-diluted product was then extracted with ether and the ether extract was washed with 5% sodium carbonate solution until distinctly alkaline to litmus, after which scrubbing was continued with water until neutrality to litmus was obtained. The ether extract was then dried over anhydrous sodium sulfate, filtered from the drying agent, and the ether removed by evaporation. The low boiling material in this residual oil was removed by distillation, and the residue, a light reddish oil, amounted to 9 grams.

This light reddish oil on analysis for sulfur showed a content for this element of 28.70% as compared with a calculated value of 28.07% for di-isobutylene dithiocyanate. In biological tests it showed an unusually valuable combination of paralytic and lethal properties requisite of fly spray toxicants and generally valuable properties as a contact insecticide toxicant. The compound is thought to be essentially 2,3-dithio-cyano-2,3,4-tri-methylpentane, depending upon the source and purity of the di-isobutylene.

My invention is particularly useful in the fly spray field where a combination of paralytic and lethal properties in proper balanced proportions is required to effect control. A toxicant may be highly paralytic without evincing any substantial lethal action, it may have both paralytic and lethal action, or it may be highly lethal without showing any pronounced paralytic action. N-octyl thiocyanate is an example of the first, N-decyl thiocyanate of the second, and N-dodecyl thiocyanate of the third. It is only by coincidence of proper balance of lethal and paralytic properties with economic factors as to availability of raw materials and feasibility of process that a toxicant assumes value in the fly spray art. Di-isobutylene dithiocyanate merits all these characteristics to a high degree and appears to be unique among dithiocyanated hydrocarbons in this regard that the raw materials are cheap and available, the process is economically feasible and the product combines paralytic and lethal properties in such degree as to make it a suitable replacement for more expensive pyrethrum sprays. Thus a saturated solution of di-isobutylene dithiocyanate in refined kerosene tested according to the standard Peet-Grady method for testing fly sprays gave a knock-down at the end of ten minutes of 95% and a kill at the end of 24 hours of 71%. Under the same conditions of evaluation that the official test insecticide (a composite blend of pyrethrum and kerosene recognized as an official control by the National Association of Insecticide and Disinfectant Manufacturers) gave 99% down and 68% kill.

While the product of my invention exhibits marked utility as a fly spray toxicant my invention is not limited thereto and may be used for the control of other types of pests such as clothes moths, red spider, aphis, and like pests, and for such other uses as aliphatic hydrocarbon dithiocyanates may be suitable.

The product of my invention may be used in various combinations with such auxiliary materials as spreaders, stickers, and other toxicants; for example, insecticides such as metallic arsenates, fluosilicates, phenothiazines, organic thiocyanates such as n-dodecyl thiocyanate and butyl carbitol thiocyanate, nicotine, anabasine (neonicotine), nor-nicotine, rotenone and its congeners, hellebore, pyrethrum, N-isobutylundecylenamide, aminomethyl sulfides, and bactericides and fungicides such as sulfur, polysulfides such as lime-sulfur, the chlorinated phenols, aminomethyl sulfides, copper acylacetonates, copper chelates of beta-keto acids and esters, copper chelates of salicylaldehyde, Burgundy mixture, Bordeaux mixture, the so-called insoluble coppers such as basic copper sulfates, copper oxychlorides, copper calcium chlorides, copper oxides, copper silicates, copper zeolites, and copper thiocyanates, the long chain quaternary ammonium halides and derivatives of dithiocarbamic acid such as ferric dimethyldithiocarbamate. They may be used in the form of aqueous sprays, dusts or solutions, dispersed with wetting agents such as the alkali metal or amine salts of oleic acid and the sulfated higher alcohols, the sulfonated animal and vegetable oils such as sulfonated fish or castor oils or the sulfonated petroleum oils; with diluents such as calcium phosphate, Bancroft clay, kaolin, diatomaceous earth, sulfur, lime, pyrophyllite, talc, bentonite, flours such as walnut shell, wheat, redwood, soyabean, cottonseed, or with organic solvents such as trichloroethylene, tetrachloroethylene, Stoddard solvent, and other hydrocarbon solvents. They may be used in vegetable and mineral oil sprays in which petroleum or vegetable oil glycerides are used as contact agents or active poisons. Various adhesive and sticking materials such as rosin and glue and various other common adjuvants such as lime may be used. Such mixtures as are here set out may have particular usefulness in special applications and frequently will give better results than would be anticipated from the killing power or repellent action of each ingredient when used alone.

I claim:
1. Di-isobutylene dithiocyanate.
2. 2,3-dithiocyano-2,4,4,-trimethylpentane.

EUCLID W. BOUSQUET.

CERTIFICATE OF CORRECTION.

Patent No. 2,342,448.                                February 22, 1944.

EUCLID W. BOUSQUET.

It is hereby certified that error appears in the printed specification of the above numbered patent requiring correction as follows: Page 1, first column, line 13, for "solvenent" read --solvent--; and second column, line 3, for "cyano-2,3,4-" read -- cyano-2,4,4- --; and that the said Letters Patent should be read with this correction therein that the same may conform to the record of the case in the Patent Office.

Signed and sealed this 2nd day of May, A. D. 1944.

Leslie Frazer (Seal)                                Acting Commissioner of Patents.